United States Patent
Runft

[11] Patent Number: 6,098,675
[45] Date of Patent: Aug. 8, 2000

[54] APPARATUS FOR METERING AND DISPENSING POWDER INTO HARD GELATIN CAPSULES OR THE LIKE

[75] Inventor: Werner Runft, Winnenden, Germany

[73] Assignee: Robert Bosch GmbH, Stuttgart, Germany

[21] Appl. No.: 09/117,813

[22] PCT Filed: Sep. 4, 1997

[86] PCT No.: PCT/DE97/01943

§ 371 Date: Aug. 10, 1998

§ 102(e) Date: Aug. 10, 1998

[87] PCT Pub. No.: WO98/25823

PCT Pub. Date: Jun. 18, 1998

[30] Foreign Application Priority Data

Dec. 10, 1996 [DE] Germany .................. 196 51 237

[51] Int. Cl.⁷ .................................................. B65B 1/04
[52] U.S. Cl. ........................................ 141/81; 141/71
[58] Field of Search .................... 141/71, 81, 73, 141/103, 144, 173, 175, 145, 146; 53/560

[56] References Cited

U.S. PATENT DOCUMENTS

| | | |
|---|---|---|
| 3,921,681 | 11/1975 | Rebmann et al. ................. 141/71 |
| 4,501,307 | 2/1985 | Moser et al. ..................... 141/71 |
| 5,855,233 | 1/1999 | Bolelli ............................. 141/81 |

*Primary Examiner*—Steven O. Douglas
*Attorney, Agent, or Firm*—Ronald E. Greigg; Edwin E. Greigg

[57] ABSTRACT

An apparatus for metering and dispensing powder into hard gelatin capsules or the like including an incrementally rotated product container. Bores that cooperate with stuffing dies and transfer dies are formed on the bottom of the product container. A repelling element is disposed in the region of the transfer die. Because of the special shape of the product container, an interstice is formed between the repelling element and a wall portion of the product container; the effect of the interstice is that the bores following the repelling element are adequately supplied with powder. The apparatus according to the invention has high metering accuracy and high output.

6 Claims, 1 Drawing Sheet

APPARATUS FOR METERING AND DISPENSING POWDER INTO HARD GELATIN CAPSULES OR THE LIKE

PRIOR ART

The invention relates to an apparatus for metering and dispensing powder into hard gelatin capsules or the like. Known apparatuses of this kind have a cup-shaped product container, in the bottom of which a plurality of groups of bores are formed that each cooperate with stuffing dies that are movable up and down and are combined into stuffing die stations. Below the product container and in coincidence with the stuffing dies, a brace in the form of a ring is provided, so that in the nonmoving phases of the intermittently rotated product container, the stuffing dies dipping into the bores form powder compacts. During a further nonmoving phase of the product container, the thus-formed powder compacts are shoved by transfer dies into capsule underparts furnished below the bores. To prevent loose powder from collecting above the powder compacts and reaching the capsule underparts as the powder compacts are inserted, the transfer dies are surrounded by a powder repeller. To enable achieving the highest possible output for a given size of the product container, the bores for the stuffing and transfer dies are all disposed near the container wall of the product container. This makes the largest possible number of bores or stuffing dies reachable at each stuffing die station.

Because of the powder repeller surrounding the transfer dies and repelling the powder, the problem arises, because of the disposition of the bores near the container wall, that the bores immediately following the powder repeller in the first stuffing die station are not supplied adequately or uniformly with powder. This leads to inaccuracies of metering, which mean that the number of bores at the stuffing die station following the powder repeller, and thus necessarily at all the stuffing die stations, has to be reduced if the desired metering accuracy is to be attained.

ADVANTAGES OF THE INVENTION

The apparatus according to the invention for metering and dispensing powder into hard gelatin capsules or the like, has the advantage over the prior art that for a given product container size, high output and simultaneously high metering accuracy can be attained.

Further advantages and advantageous refinements of the apparatus according to the invention for metering and dispensing powder into hard gelatin capsules or the like will become apparent from the set forth hereinafter description.

By means of a baffle element in the product container, powder can be delivered in targeted fashion to individual bores, thus additionally increasing the output.

To create additional space for devices that cooperate with the metering container, it is advantageous for part of the bottom of the product container to be elevated in its outer region.

BRIEF DESCRIPTION OF THE DRAWING

One exemplary embodiment of the invention is shown in the drawing and will be described in further detail below.

DESCRIPTION OF THE EXEMPLARY EMBODIMENT

Figure 1:
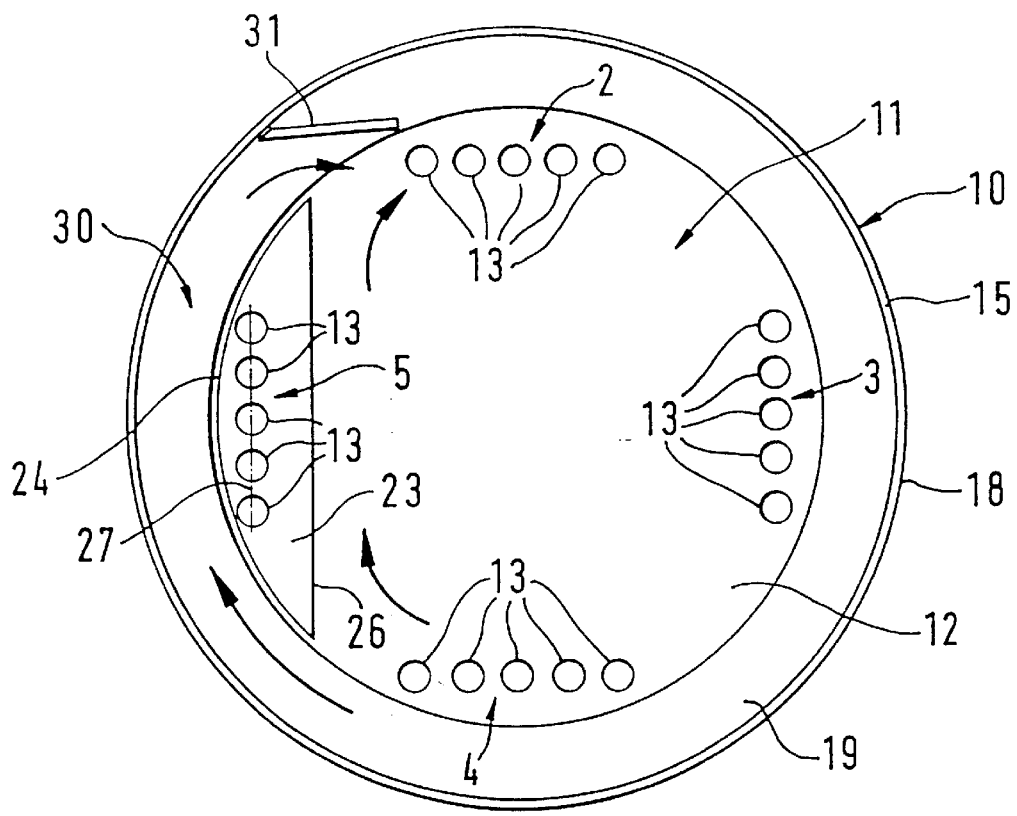
FIG. 1 shows an apparatus for metering and dispensing powder into hard gelatin capsules or the like in a longitudinal section.
Figure 2:
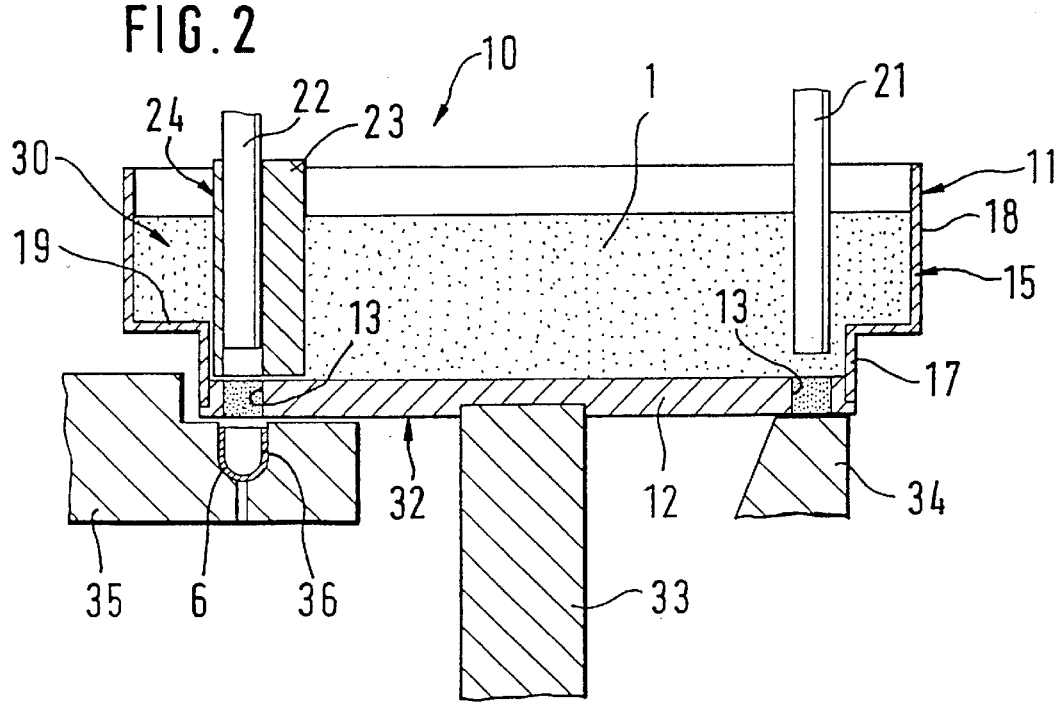
FIG. 2 shows a product container in a section taken in the plane II—II of FIG. 1.

The apparatus 10 shown in FIG. 1 for metering and dispensing powder 1 into hard gelatin capsules or the like has a cup-shaped, incrementally rotatable product container 11 for the powder 1. The product container 11 has a disklike bottom 12, which four groups 2–5, each of five bores 13, are formed. The center points of the bores 13 of each group 2–5 are each disposed on one straight-line segment, and the groups 2–5 are each offset by 90° from one another in an outer region of the bottom 12. The bottom 12 is surrounded by a jacket 15, which inside the product container 11 forms a region that is annularly raised relative to the bottom 12. This is attained by providing that the jacket 15 has two vertically disposed wall portions 17, 18, which are joined together by a horizontally disposed bottom portion 19. Consequently the product container 11 has a lesser diameter in the region of the first wall portion 17 than in the region of the second wall portion 18.

Above and in coincidence with the bores 13, three groups of stuffing dies 21 are disposed in three stuffing die stations, and one group of transfer dies 22 is disposed in a transfer station. Both the stuffing dies 21 and the transfer dies 22 are embodied to be movable up and down by known means which are therefore not shown, and thus during the various nonmoving phases of the product container 11 they dip into the bores 13. The transfer dies 22 are surrounded, in the region of the product container 11, by a stationary powder repelling body 23. The powder repelling body 23, which is in the form of a portion of a circle in cross section and which extends to directly at the bottom 12 of the product container 11, has a first wall 24 that is adapted in form-locking and virtually gapless fashion to the course of the first wall portion 17 of the jacket 15, while conversely a second wall 26 of the repelling body 23 is located parallel to a straight line 27 on which the bores 13 of the transfer dies 22 are disposed. Between the wall 24 of the powder repelling body 23 and the second wall portion 18 of the product container 11, an interstice 30 for the powder 1 is formed, whose width is equivalent to the width of the bottom portion 19 of the product container 11.

The first group 2 of bores 13 or stuffing dies 21 following the powder repelling body 23 in the clockwise direction is assigned a stationary powder baffle 31, which is disposed in the region of the bottom portion 19 of the product container 11 and extends virtually all the way to it. The disposition of the powder baffle 31 is such that it extends parallel and behind the bores 13 associated with it and carries the powder 1 located in the interstice 30, upon a clockwise rotation of the product container 11, at least partly into a region between the bores 13 and the wall portion 18 oriented toward it.

The product container 11 is solidly joined on its underside 32 to a shaft 33, which is incrementally rotated by a drive motor, not shown. In the region in which the bores 13 are also formed in the bottom 12, the underside 32 of the product container 11 is covered by an intermediate ring 34, which is virtually flush with the underside 32 of the product container 11. In the region of the powder repelling body 23, below the product container 11, a segment 35 in which bores 36 for capsule underparts 6 are embodied can be pivoted inward. The disposition of the bores 36 in the segment 35 is equivalent to the disposition of the bores 13 and transfer dies 22.

The above-described apparatus 10 for metering and dispensing powder 1 into hard gelatin capsules or the like functions as follows: The product container 11, filled with powder 1, is incrementally rotated clockwise by the shaft 33 by one division at a time, or in other words 90° at a time in the exemplary embodiment. In this process the powder 1 is placed below the respective group of stuffing dies 21, which in the ensuing nonmoving phase of the product container 11 dip into the bores 13, thus forming powder compacts in the bores 13.

Because upon a rotation of the product container 11 powder 1 gets into the interstice 30 between the powder repelling body 23 and the wall portion 18, the first group 2 of bores 13 following the powder repelling body 23 is always adequately supplied with or covered by powder 1. This powder 1 derives at least in part from the interstice 30, and by means of the powder baffle 31 it can be additionally delivered in targeted fashion to individual bores 13 of the group 2.

The powder compacts thus formed are transferred, once the bores 13 have been pivoted below the powder repelling body 23, by means of the transfer dies 22 into the furnished capsule underparts 6 in the segment 35. Next, the segment 35 is pivoted out of the range of the apparatus 10, so that another segment 35 with empty capsule underparts 6 can be pivoted to below the transfer dies 22.

It will also be noted that the apparatus 10 and the product container 11 can be modified in various ways. For instance, it is conceivable and also usual in particular to provide, instead of three groups 2, 3, 4 of bores 13, a greater number of groups of bores 13, and thus also a greater number of stuffing die stations. Also in this case, because of the special embodiment of the product container 11, the first group of bores 13 following the powder repelling body 23 will be better supplied with powder 1, so that the metering accuracy is increased. It will also be noted that the height of the wall portions 17, 18 of the jacket 15 is due to the devices that cooperate with the product container 11. However, the lower the bottom portion 19 can be disposed in comparison with the bottom 12, the better will also be the supply of powder 1 to the first group of bores 13 following the powder repelling body 23.

The foregoing relates to a preferred exemplary embodiment of the invention, it being understood that other variants and embodiments thereof are possible within the spirit and scope of the invention, the latter being defined by the appended claims.

What is claimed is:

1. An apparatus (10) for metering and dispensing powder (1) into hard gelatin capsules or the like, comprising an incrementally rotatable product container (11) which contains the powder, in a bottom (12) of said product container, groups (2–5) of bores (13) for the powder (1) are embodied in said bottom (12) of said product container, stuffing dies (21) that correspond with said bores (13) are driven into and retracted from the bores (13) for forming powder compacts in said bores (13), element (23) for the powder (1), for shifting the powder compacts in said bores (13) into furnished capsule underparts (6), between an encompassing wall (15) of the product container (11) and the repelling element (23) an interstice (30) for the powder (1) is embodied, so that the powder (1) located in the interstice (30) is delivered to a region of the first group (2) of bores (13) following the repelling element (23) in the feeding direction of the powder (1).

2. The apparatus of claim 1, in which the encompassing wall (15) comprises two vertically offset disposed wall portions (17, 18), which are joined to one another by means of an annularly embodied false bottom (19), so that the false bottom (19) is disposed at an elevated height relative to the bottom (12), and that the interstice (30) is embodied above the false bottom (19).

3. The apparatus of claim 2 in which the repelling element (23) is embodied in the form of a portion of a circle and has a verticle side (24), oriented toward the encompassing wall (15) of the product container, said vertical side, at a level of the first wall portion (17) of the wall (15), extends virtually without any gap relative to the first wall portion (17), and, at a level of the second wall portion (18) of the wall (15), extends spaced apart from the second wall portion (18), thereby forming the interstice (30).

4. The apparatus of claim 2, in which the first group (2) of bores (13) is assigned a baffle element (31) across said interstice which forces the powder (1) toward said bores (13).

5. The apparatus of claim 1 in which the first group (2) of bores (13) is assigned a baffle element (31) across said interstice which forces the powder (1) toward said bores (13).

6. The apparatus of claim 3, in which the repelling element (23) is embodied in the form of a portion of a circle and has a vertical side (24), oriented toward the encompassing wall (15) of the product container, said vertical side, at a level of the first wall portion (17) of the wall (15), extends virtually without any gap relative to the first wall portion (17), and, at a level of the second wall portion (18) of the wall (15), extends spaced apart from the second wall portion (18), thereby forming the interstice (30).

* * * * *